June 1, 1926.  
J. G. MACLAREN ET AL  
1,586,634
POWER CONTROL DEVICE FOR PNEUMATIC DISPATCH SYSTEMS
Filed Nov. 3, 1924  2 Sheets-Sheet 2
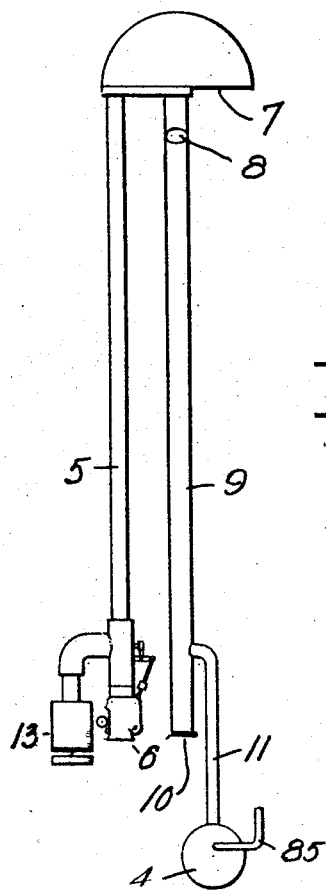
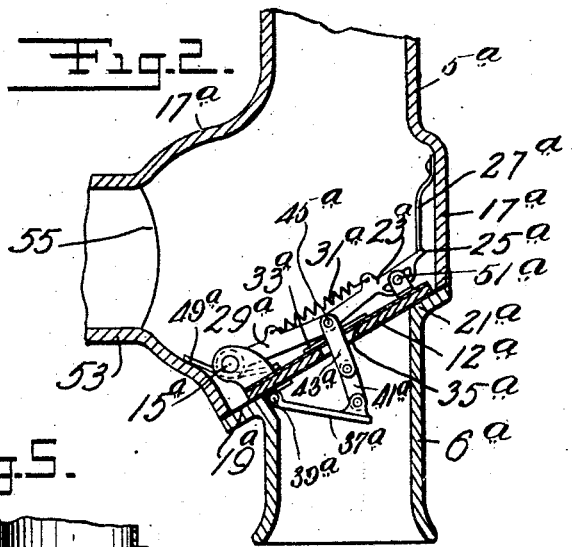
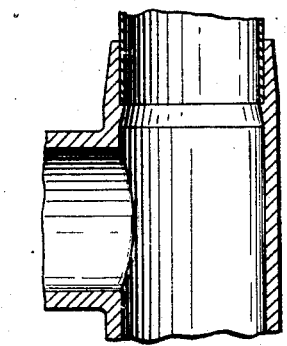
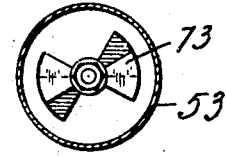
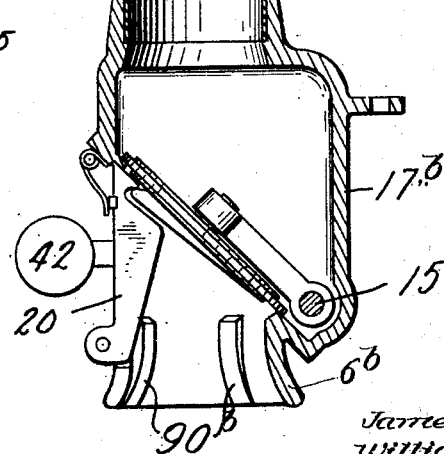
INVENTORS
James G. Maclaren,
William J. Hepperle,
BY
Roberts Roberts & Cushman
ATTORNEY Patented June 1, 1926.

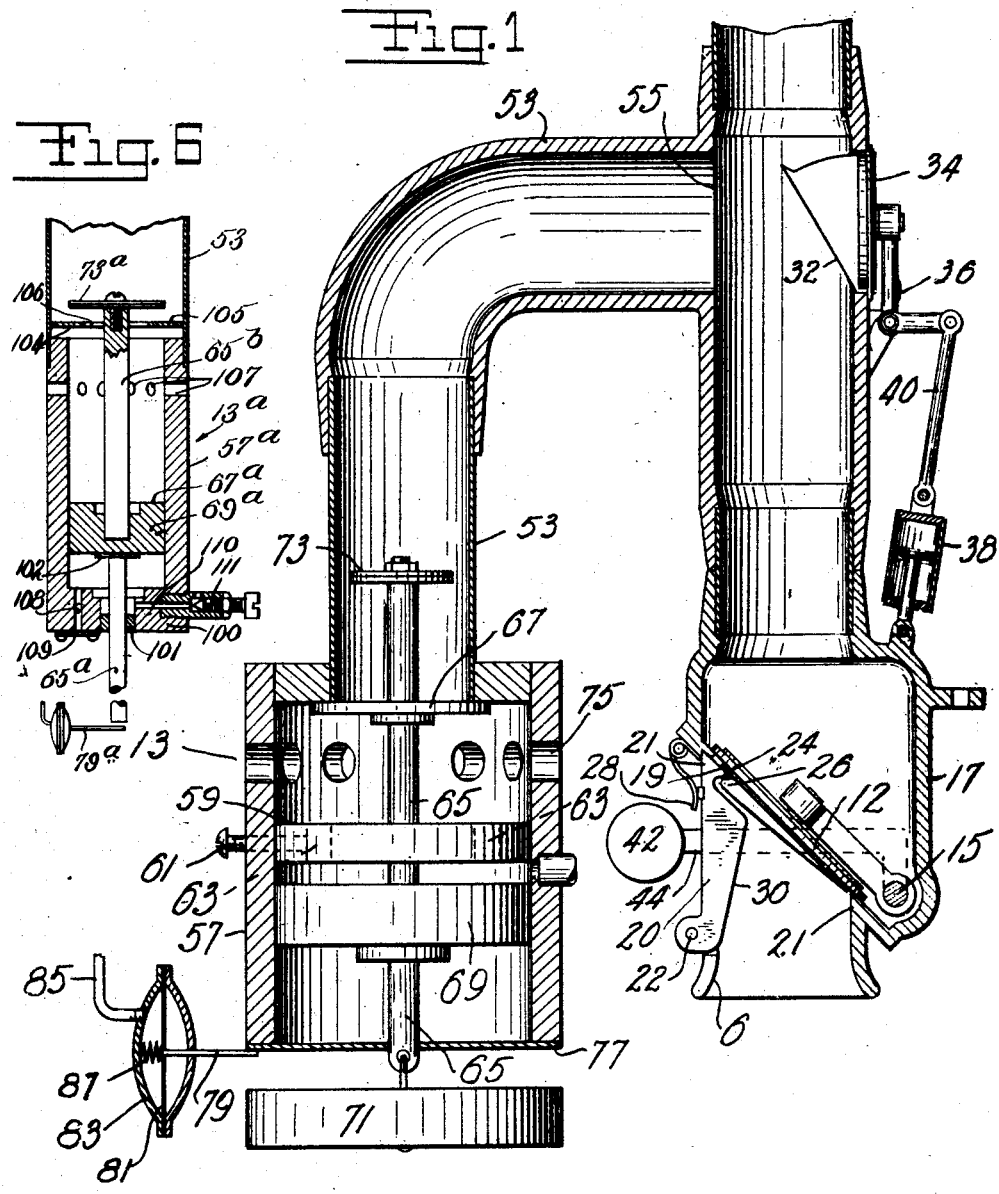

1,586,634

UNITED STATES PATENT OFFICE.

JAMES G. MACLAREN, OF MAMARONECK, NEW YORK, AND WILLIAM J. HEPPERLE, OF BLOOMFIELD, NEW JERSEY, ASSIGNORS TO THE LAMSON COMPANY, OF SYRACUSE, NEW YORK, A CORPORATION OF MASSACHUSETTS.

POWER-CONTROL DEVICE FOR PNEUMATIC-DISPATCH SYSTEMS.

Application filed November 3, 1924. Serial No. 747,435.

This invention relates generally to pneumatic dispatch systems and more particularly to means for controlling the flow of air through the carrier transmission tubes in accordance with the dispatching requirements.

An object of the invention is to provide improved means for limiting or restricting the flow of air through the pneumatic tubes of an exhaust dispatch system when the tubes are not being traversed by carriers.

The invention includes means associated with the inlet end of a tube line for automatically shutting off access of air into the line except when a carrier occupies the line for transmission either toward or from a central station where the inlet terminal is located. A feature of the invention is a valve or gate normally tending to move to a latched position to close the inlet terminal and adapted to be unlatched and moved to open position by the engagement therewith of a carrier inserted in the inlet opening. Another feature of the invention is the provision of a valve controlled inlet arranged to be uncovered by the change in pressure conditions caused by the opening of the carrier inlet gate and automatically to move to a closed position when subjected to the pressure variations produced in the sending tube by a moving carrier and the increased velocity of flow of air in the tube immediately following the exit of the carrier from the delivery end of the tube.

In the drawings in which a preferred embodiment of the invention has been selected for illustration, Figure 1 is a view in vertical section of the dispatch end of a transmission line equipped with a control device embodying the invention.

Figure 2 is a view similar to Figure 1 showing a modified form of gate for the inlet terminal.

Figure 3 is a detail view showing a variable sized baffle or vane forming part of the invention;

Figure 4 is a diagrammatic view of a double tube dispatch line with which the invention may be used;

Figure 5 is a view similar to Figure 2 showing a further modified form of carrier inlet; and Figure 6 is a vertical sectional view illustrating a modified form of air controlling device.

Referring to the drawings for a more detailed description of the invention a double line system is shown in Figure 4 of the drawing, such system comprising an outgoing line 5 having an inlet or dispatch terminal at 6 located in a central receiving and dispatch station and a delivery terminal 7 at a remote sending station. The return line 9 is connected to the line 5 at the sending station and has an inlet opening 8 at said station and a delivery opening 10 adjacent to the inlet terminal 6 at the central station. The incoming line 9 is connected through a pipe 11 with a header 4 communicating with any suitable source of exhaust so that there is a constant suction in the header tending to draw air into the double tube line at the inlet terminal 6 in the central station around through the line 5 and back through the line 9 to the source of exhaust.

In order to obviate the use of an exhausting pump of sufficient capacity to cause a full flow of air through all the pneumatic dispatch tubes of a system, means is provided for controlling and restricting the flow of air to accord with what is needed to actually dispatch the required carriers through the dispatch or transit tubes. The means for thus controlling the flow of air through the dispatch tubes includes a special valve or gate member 12 for each of the inlet terminals 6 and 8 of the double line tubes and a controlling device shown at 13 for shutting off the supply of air to the tube when a carrier has completed its journey.

The terminal 6 is formed at the lower end of a casing 17 attached to the inlet end of the transmission tube 5 and is illustrated as provided with a preferred from of closure comprising a gate 12 mounted upon a shaft 15 turning in bearings in the casing 17 and arranged to close against an annular seat 21. A latch member 20 is hinged at the point 22 between lugs projecting from the casing 17 and is provided with a catch 24 for engagement with an ear 26 carried by the under side of the gate 12. A spring 28 secured to the casing 17 tends to move the latch 20 into position for engagement with the ear 26. The latch 20 is provided with an inclined cam face 30 for engagement by a carrier inserted in the terminal 6. Pressure of the carrier against the cam face 30 forces the latch out of engagement with the ear 26 on the gate 12 and permits the gate to be opened so that the carrier can pass into the casing 17 and begin its travel through the outgoing tube 5.

As the carrier passes along the tube 5 it engages a cam fin 32 projecting inwardly from a valve 34 normally closing a port in the side of the tube 5 and opens the same to permit entrance of air into the tube at the rear of the carrier which releases the suction in the line and thus brings about the release of the controlling device 13 to admit a supply of air to the tube 5 behind the traveling carrier therein.

The gate 12 is swung to its closed position when the carrier has passed by means of a weight 42 carried by an arm 44 secured to the shaft 15.

A spring 36 tends to restore the valve 34 to closed position, the return movement of the valve being retarded by a dash pot device shown at 38 to which the valve 34 is connected through a link 40.

The modified gate mechanism illustrated in Figure 2 of the drawings, includes a gate $12^a$ mounted on rock shaft $15^a$ journalled in the enlargement or casing $17^a$ forming the dispatch terminal of the outgoing tube $5^a$. The gate $12^a$ normally makes airtight contact with a gasket $19^a$ resting on a valve seat $21^a$ formed on the upper edge of the removable inlet section $6^a$, a spring $49^a$ tending to restore the gate to this position after being opened.

In order normally to hold the gate $12^a$ closed a latch is provided which consists of a link $23^a$ whose free end $25^a$ normally engages a spring catch $27^a$ carried by the casing $17^a$. The link $23^a$ is hinged at its inner end to one end of a link $29^a$ whose other end is pivoted to turn on shaft $15^a$. The links $23^a$ and $29^a$ thus form a toggle device having its two links or arms connected by a contractile spring $31^a$ which normally holds the arms in the depressed position shown in Figure 2 with the joint at $45^a$ adjacent to the inner surface of the gate and causes the extended end $25^a$ of the link or arm $23^a$ to engage the catch $27^a$ and thereby latch the gate in its closed position.

When the gate is closed, the toggle device also holds a valve member $33^a$ in engagement with a seat surrounding an orifice $35^a$ formed in the gate $12^a$ thus preventing access of air through the inlet terminal $6^a$ to the dispatch tube $5^a$. The valve $33^a$ has substantially the same purpose as the valve 34 of the modification shown in Figure 1 already referred to, that is, the opening of the valve $33^a$, which takes place as a preliminary to the opening of the carrier inlet gate $12^a$, destroys the partial vacuum in the casing $17^a$ and brings about the operation of the automatic valve controller 13 to open an inlet port and permit the entrance of air to the transit tube.

In order to unseat the gate $12^a$ and permit the ingress of a carrier into the casing $17^a$ and tube $5^a$ a latch releasing arm $37^a$ is provided which is hinged at $39^a$ on the gate $12^a$ and is connected through links $41^a$ and $43^a$ to the hinge point $45^a$ of the toggle links or arms $23^a$ and $29^a$. Insertion of a carrier into the inlet terminal $6^a$ engages and elevates the latch operating arm $37^a$ and thereby forces the hinge point $45^a$ of the toggle arms to an elevated position which lifts the valve $33^a$ from its seat and withdraws the extended end $25^a$ of the arm $23^a$ from its latching engagement with the spring catch $29^a$. The continued upward movement of the carrier under the pressure of the hand of the operator lifts the gate $12^a$ from its seat $21^a$ and thereby clears the passage for the entrance of the carrier into the casing 17.

When the carrier has passed through the gate $12^a$ the spring $49^a$ becomes effective to return the gate to its closed position. Meanwhile the toggle arms $23^a$ and $29^a$ whose upward movement is limited by a stop member $51^a$, respond to the momentum of the closing movement of the gate to swing past the mid position to again take the position shown in Figure 2 of the drawing, thus bringing the face end $25^a$ of the arm $23^a$ into latching engagement with the catch $27^a$ and at the same time forcing the valve $33^a$ to its seat to close the vent opening $35^a$ in the gate $12^a$.

The controlling device 13 which has already been referred to is connected through a conduit 53 with the casing 17 or $17^a$ at the point 55 above the position of the gate. The controlling device 13 includes a hollow cylindrical casing 57 in which there is mounted a fixed partition 59 held in place by a suitable means such as a screw 61. The partition 59 is provided with a series of openings 63 through which air can pass from the space below the partition to the chamber formed in the upper part of the casing 57 above the partition member 59. Slidably mounted in the partition 59 is a valve rod 65 which carries a sealing valve 67 normally engaging the inner wall of the upper end of the casing 57 to prevent the flow of air from the casing into the tube 53. Carried on the valve rod 65 and movable with it is a piston 69 which is fitted to the casing 57 to slide therein beneath the partition 59. The lower extremity of the valve rod 65 carries a receptacle 71 in which may be placed material to constitute a balancing weight for adjusting the control device for most effective operation.

The upper end of the rod 65 is provided with a two-part baffle or vane 73 whose area is adjustable (Fig. 3) by rotating one of its parts relatively to the other. The baffle 73 is mounted on the extended end of the rod 65 within the tube 53.

When the gate 12 or 12ᵃ has been opened in the manner described by the introduction of a carrier, the release of the partial vacuum which normally exists in the casing 17 and tube 53 is effected so that the valve 67 under the pull of the weighted receptacle 71 is withdrawn from sealing engagement with the lower end of the tube 53 and drops to a position just above partition 63. This operation permits air from inlet ports 75 which open through the side wall of the casing near its upper end to enter the casing 57 and the pipe 53, thus initiating the flow of the carrier propelling current in the transmission tube 5.

The continued flow of air through the casing 57 into the tube 53 tends to lift the piston 69 and thus gradually moves the valve 67 toward its sealing position against the end of the tube 53. This movement of the valve 67 toward its sealing position continues during the travel of the carrier through the tube 5. Upon the exit of the carrier from the tube 5 at the outlet terminal an increased rush of air through the tube 5 is momentarily produced and this rush of air acting upon the baffle or vane 73 lifts the rod 65 and completes the closing of the valve 67. The action of the low-velocity air upon the baffle 73 during the movement of the carrier through the tube, while less pronounced, assists the piston 69 to some extent at least in producing the gradual upward movement of the valve 67 to its sealing position.

The seating of the valve 67 immediately after the exit of the carrier from the delivery end of the tube 5 shuts off the flow of air through the tube and thereby prevents the unnecessary use of power to move the idle column of air. A similar operation takes place when the carrier is dispatched through an incoming tube 9 because the opening of the inlet valve 8 at the outlying end of the incoming tube brings about a drop of pressure in the inlet tube 5 and the connecting tube 53 which permits the weighted receptacle 71 to move the valve 67 from its sealing position. The travel of the carrier through the tube 9 will be accompanied by the gradual rise of the sealing valve 67 as in the case already described.

The provision of the baffle or vane 73 actuable by the kinetic energy of the air passing through the tube 53 effects an important function in that a clean-cut and definite operation of the controlling means is thereby insured.

In order that the sealing valves 67 of the several control devices 13 of the system be in closed position when starting the exhauster, it is desirable to maintain the valves 67 in their closed condition following the previous shutting down of the exhausting pump. In the preferred form of the invention this is effected by making use of a member 77 carried by the rod 65 and adapted to be engaged by a latch rod 79 carried by a diaphragm 81 in a casing 83. The other side of the diaphragm 81 is connected through a tube 85 with the exhaust header 4 at any suitable point. A spring 87 acts to project the latch rod 79 beneath the member 77 and thereby retain the rod 65 and valve 67 in its elevated position when the suction in the tube 85 disappears upon the shutting down of the exhaust device.

In Figure 5 of the drawing is shown a modified form of carrier inlet 6ᵇ which is provided with inwardly directed flanges 90ᵇ which permit air to pass into the casing 17ᵇ around the sides of the carrier during the operation of passing the carrier through the gate. This construction avoids the use of a valve such as is shown in Figures 1 and 2 for bringing about a preliminary disruption of the partial vacuum conditions to cause the inlet valve 67 in the control device 13 to move to open position.

The weight carried by the receptacle 71 can be varied to adjust the lift of the valve 67 to accord with the length of the transit tube and the volume of air required to pass through the control device. Also the effective area of the baffle 73 can be varied by adjustment of its blades into greater or less overlapping engagement to produce the desired effect at the proper time.

Referring to the modified construction shown in Fig. 6, the air inlet controlling device 13ᵃ is illustrated as comprising the cylindrical casing 57ᵃ closed at its lower end at 100 and secured at its upper end to the lower end of the conduit 53.

The lower end 100 of the casing is provided with a central opening defined by a bushing 101 which guides the vertically sliding rod 65ᵃ preferably provided with an enlarged head 102 at its upper end to prevent the rod from escaping from the casing. A piston 69ᵃ fits snugly within the casing 57ᵃ and normally rests upon the head 102 of the rod 65ᵃ. A piston rod 65ᵇ is secured at its lower end to the piston 69ᵃ and extends upwardly through the casing and into the lower end of the conduit 53. A baffle or vane 73ᵃ, preferably adjustable in area, is secured to the upper end of the rod 65ᵇ. The lower end of the casing 57ᵃ is furnished with a passage 108 leading to the atmosphere, the outer end of this passage being controlled by a check valve 109 adapted to permit free escape of air from the lower part of the casing but to prevent free ingress of air. The lower end of the casing is also furnished with a passage 110 leading to the atmosphere and controlled by an adjustable needle valve 111.

The upper surface 67ᵃ of the piston 69ᵃ constitutes a valve which is adapted to co-operate with an annular seat surface 104 provided by a flange 105 projecting radially inward from the lower part of the conduit 53. While for convenience in assembly this flange may be as shown, formed as a part of the conduit 53 it may, if desired, form a part of or be secured to the upper end of the casing 57ᵃ. The valve seat 104 defines an orifice 106 through which air may pass from the interior of the casing 57ᵃ into the conduit 53. The upper part of the casing 57ᵃ is furnished with air inlet openings 107 spaced from the lower surface of the valve seat 104 a distance at least as great as the vertical thickness of the piston 69ᵃ.

The lower end of the rod 65ᵃ may be arranged to engage a retaining latch 79ᵃ actuated in the same manner as the latch 79 above described.

Normally the piston 69ᵃ occupies the upper part of the casing 57ᵃ with its valve element 67 engaging the seat surface 104, the piston being held in this position by the suction within the conduit 53. When a carrier is placed in the transmission tube the suction in the conduit 53 drops and the weight of the piston 69ᵃ causes it to slide downwardly in the casing thus uncovering the orifice 106 and permitting a free flow of air to enter through the openings 107 and orifice 106 into tube 53. The flowing air tends to evacuate the space above the piston so that the latter begins slowly to rise, the rate of movement being regulated by the adjustment of the needle valve 111. As the piston rises and passes the openings 107 it gradually cuts off the air flow through the latter but as its lower surface passes upwardly beyond said openings a free flow of air is permitted to enter the space beneath the piston so that the piston is forcibly propelled into operative engagement with the seat 104 thus effectively closing the orifice 106.

For proper operation the needle valve 111 is so set that the valve will not close until the carrier has emerged from the transmission tube. At this instant there occurs a sudden increase in velocity in the air passing through the conduit 53 and this rapidly moving air acts mechanically upon the baffle 73ᵃ, causing it to exert a sudden lifting action upon the valve, thereby accelerating its rate of closure so that the interval between delivery of the carrier and closure of the valve is reduced to a minimum.

While the form of mechanism here shown and described is admirably adapted to fulfill the objects primarily stated, it is to be understood that it is not intended to confine the invention to the one embodiment herein disclosed, for it is susceptible of embodiment in various forms all coming within the scope of the claims which follow.

We claim:

1. A pneumatic dispatch system comprising a transmission line, means tending to create a carrier propelling air current in the line, a dispatch terminal for the line, an inwardly opening gate normally closing said terminal, a normally closed controlling valve the opening of which initiates the flow of the carrier propelling air current in the line, said controlling valve opening automatically when the dispatch terminal gate is opened, and an air actuated baffle spaced from but connected to the valve for closing the latter, said baffle being at all times disposed at the inner side of the valve orifice.

2. A pneumatic dispatch system having a transmission tube and a dispatch terminal therefor, said terminal being provided with a normally closed inwardly-opening carrier gate, a port for admitting air to the transmission line, a normally closed closure member for the port, means for opening said closure when a carrier is inserted into the tube through the carrier gate, and a member disposed at all times at the inner side of said port and responsive to the kinetic energy of flow of air through the admission port for moving the closure member toward port-closing position.

3. A pneumatic dispatch system comprising a transmission tube having a dispatch terminal, a normally closed inwardly-opening carrier gate in said terminal, a latch for holding the gate closed, means engageable by a carrier entering the terminal for releasing the latch, a port for admitting air to the tube, a normally closed controlling valve for the port, said valve opening automatically when a carrier is inserted in the tube through the carrier gate, and means including a baffle member responsible to the flow of air through the admission port for returning the valve to port-closing position, said baffle member being disposed at all times at the inner side of said port.

4. A pneumatic dispatch system comprising a central station, an outgoing transmission tube leading from the central station and terminating at a remote sending station, an incoming transmission tube having a connection at the sending station with the outgoing tube to permit air to flow from one tube to the other, exhaust means at the central station having a connection with the incoming tube tending to produce a carrier-propelling flow of air through the tubes, an air inlet port at the central station end of the outgoing tube, a closure for said port normally held in closed condition by suction, said valve opening automatically when the suction is released, carrier actuated means for releasing the suction when a carrier is placed in either tube, and a baffle responsive to the velocity of flow of air into the tube through said opened inlet port gradually to move the closure member to closed position, said baffle being disposed at all times at the inner side of said port.

5. A pneumatic dispatch system comprising a transit tube having a dispatch terminal, an inwardly opening, normally closed gate in the terminal, means tending to cause air to flow through the tube to propel carriers therethrough, an air-admission port adjacent to the dispatch terminal, a closure member normally closing the port and arranged to open when a carrier is inserted through the gate in the dispatch terminal, and a baffle spaced from the closure member and disposed at the inner side of the port, said baffle being responsive to the velocity of flow of air into the tube for actuating the closure member to close the air-admission port.

6. A pneumatic dispatch system comprising a transit tube, means tending to cause air to flow through the tube to propel carriers therethrough, an air-admission port adjacent to the dispatching end of the tube, a closure member normally closing the port, means actuable by a carrier inserted in the dispatch end of the tube for causing the closure to open and admit a carrier propelling air current to the tube, and means including a pressure actuated piston and a baffle responsive to the rush of air through said port for restoring the closure to normal position.

7. A pneumatic dispatch system having a transmission line and a dispatch terminal therefor, said terminal comprising a casing having an entrance passage, a gate within the casing normally closed to prevent admission of air to the line, a latch for locking the gate in closed position, toggle means normally retaining the latch in locking position, and means actuable by engagement with a carrier thrust into the entrance passage for breaking the toggle thereby retracting the latch to inoperative position.

8. A pneumatic dispatch system having a transmission line and a dispatch terminal therefor, said terminal comprising a casing having an entrance passage, an annular seat within the casing coaxial with the passage, an inwardly swinging gate normally locked in engagement with said seat to close the passage, said gate having an orifice therethrough, a cover for said orifice, and means engageable by a carrier thrust into the entrance passage to uncover said orifice and to unlock the gate.

9. A pneumatic dispatch system having a transmission line and a terminal therefor, said terminal comprising a casing having an entrance passage, a seat within the casing, an inwardly swinging gate normally engaging said seat to close the passage, said gate having an orifice therethrough, a toggle device comprising a lever arm pivoted coaxially with the gate and a link pivotally connected to the free end of the lever arm, the link having a latch member at its end normally engaging a fixed member to hold the gate closed, a cover for the orifice connected to the free end of said lever arm, and a member projecting through the orifice for engagement by a carrier for breaking the toggle.

10. A pneumatic dispatch system having a transmission line and a terminal therefor, said terminal comprising a casing having an entrance passage for admission of a carrier, a pivoted gate normally closing the passage, a toggle device at the inner side of the gate comprising a lever arm pivoted at one end coaxially with the gate, a link pivotally connected to the free end of the lever arm, a spring tending to move the joint between the lever arm and link toward the gate, a latch normally engaging a fixed part to lock the valve in closed position, and a member disposed in the path of a carrier thrust into the entrance passage and movable thereby to move the joint between the link and lever arm away from the gate thereby retracting the latch from said fixed part and allowing the gate to open.

11. A pneumatic dispatch system having a transmission line and a dispatch terminal therefor having a normally closed inlet passage, and a controller for determining the initiation of carrier propelling air flow in the line, said controller comprising a casing, a conduit connecting the casing to the transmission line, a valve within the casing normally closing the entrance to the conduit, said valve normally being held closed by difference in pressure at its opposite sides, but opening upon a rise in pressure in the transit tube, an air actuated baffle in the conduit for moving the valve toward its closed position, and means for limiting the rate of closing of said valve.

12. A pneumatic dispatch system having a transmission line in which suction is normally maintained and controlling means for opening said line to the air to permit a carrier propelling current to enter comprising a cylindrical casing, a conduit connecting one end of the casing with the transmission line, a piston sliding within the casing, a valve element movable with the piston and normally closing the entrance to the conduit, the casing having an inlet orifice intermediate its ends through which air may pass to the conduit when the valve is open, and means movable by the kinetic energy of air flowing into the conduit and acting in conjunction with the piston to close the valve.

13. A pneumatic dispatch system having a transmission line in which suction is normally maintained, and controlling means for opening said line to the air to permit a carrier propelling current to enter comprising a cylindical casing, a conduit connecting one end of the casing with the transmission line, a valve element normally closing the entrance to the conduit, a piston moving with the valve element and having a sliding fit within the casing, difference in pressure upon opposite sides of the piston tending to restore the valve element, after it has been opened, to closed position, and means actuated by the kinetic energy of air flowing through the open valve to assist the piston in closing the valve.

14. A pneumatic dispatch system having a transmission line in which suction is normally maintained and controlling means for opening said line to admit a carrier propelling air current, said means comprising a vertically disposed cylindrical casing, a conduit leading from the upper end of the casing to the transmission line, the casing being provided with a lateral inlet opening adjacent to but below its upper end, a valve element normally closing the entrance to the conduit, said valve element being normally held up in closed position by the suction in the transmission line but dropping upon rise in pressure in the transmission line, a piston moving with the valve element and having a sliding fit in the cylinder, and a baffle member disposed in the conduit and actuable by an air current flowing through the latter, said baffle being connected to the valve element.

15. A pneumatic dispatch system having a transmission line in which suction is normally maintained and controlling means for opening said line to admit a carrier propelling air current said means comprising a vertically disposed cylindrical casing, a conduit leading from the upper end of the casing to the transmission line, the casing being provided with a lateral inlet opening adjacent to but below its upper end, the lower end of the cylinder being closed, a valve element in the cylinder normally closing the entrance to the conduit, a piston moving with the valve element and having a close sliding fit in the cylinder, a baffle of less diameter than the conduit disposed within the latter, means connecting the baffle to the valve, an orifice in the lower end of the cylinder below the piston, and a check valve substantially preventing entrance of air through said orifice but allowing its free escape therefrom.

16. A pneumatic dispatch system having a transmission line in which suction is normally maintained and controlling means for opening said line to admit a carrier propelling air current, said means comprising a vertically disposed cylindrical casing, a conduit leading from the upper end of the casing to the transmission line, the casing beng provided with a lateral inlet opening adjacent to but below its upper end, a piston having a sliding fit in the casing, the upper surface of the piston constituting a valve and normally closing the entrance to the conduit, a baffle plate disposed within the conduit, a member connecting the baffle to the valve, a check valve in the lower end of the casing permitting air freely to escape therefrom but substantially preventing its entrance, and an adjustable needle valve admitting air in predetermined amount to enter the lower part of the casing below the piston.

17. A pneumatic dispatch system having a transmission line in which suction is normally maintained and controlling means for opening said line to admit a carrier propelling air current, said means comprising a vertically disposed cylindrical casing, a conduit leading from the upper end of the casing to the transmission line, the casing being provided with a lateral inlet opening adjacent to but below its end, a valve in the casing normally closing the entrance to the conduit but when open admitting air freely to enter the conduit, means for closing the valve, means for retarding its closing movement and air actuated means disposed within the conduit and connected to the valve for lifting the latter toward its seat.

18. A pneumatic dispatch system having a transmission line in which suction is normally maintained and controlling means for opening said line to admit a carrier propelling air current, said means comprising a vertically disposed cylindrical casing, a conduit leading from the upper end of the casing to the transmission line, the casing being provided with a lateral inlet opening adjacent to but below its end, a valve in the casing normally held up by the suction in the transmission line to close the entrance to the conduit, and means operative upon cessation of suction in the transmission line to prevent the valve from opening.

19. A pneumatic dispatch system having a transmission line in which suction is normally maintained, and controlling means for opening said line to admit a carrier propelling air current, said means comprising a vertically disposed cylindrical casing, a conduit leading from the upper end of the casing to the transmission line, the casing being provided with a lateral inlet opening adjacent to but below its upper end, a valve in the casing normally held in position by the suction in the transmission line to close the entrance to the conduit, a stop operative upon cessation of suction in the transmission line to prevent the valve from opening, and a suction actuated device normally holding the stop in inoperative position.

20. A pneumatic dispatch system having a transmission line in which suction is normally maintained and controlling means for opening said line to admit a carrier propelling air current, said means comprising a vertically disposed cylindrical casing, a conduit leading from the upper end of the casing to the transmission line, the casing being provided with a lateral inlet opening adjacent to but below its upper end, a valve in the casing normally held in position by the suction in the transmission line to close the entrance to the conduit, a spring actuated stop positioned to prevent opening of the valve when suction in the transmission line ceases, and a diaphragm connected to the stop and normally holding it out of operative position in opposition to its spring so long as working suction prevails in the transmission line.

21. A pneumatic dispatch system having air controlling means comprising an elongate casing having a valve seat therein, an inlet orifice below the valve seat but above the bottom of the casing, a valve movable from a position where it engages the valve seat to a position where it is below the inlet orifice, a baffle disposed above the valve seat at all times, and means connecting the baffle to the valve.

22. A pneumatic dispatch system having air controlling means comprising an elongate substantially cylindrical casing having an annular valve seat therein and an inlet orifice in its side wall intermediate the valve seat and the bottom of the casing, a valve receivable within the lower part of the casing, a stem projecting upwardly from the valve, and means carried by the stem for lifting the valve up against its seat.

23. A pneumatic dispatch system having air controlling means comprising a casing through which an air current flows, said casing being provided with a valve seat, a lateral air inlet orifice below the valve seat, a valve movable upwardly past the inlet orifice into engagement with the seat, and means above the valve seat exposed to the air current passing through the valve seat and actuable by such current for lifting the valve into the air current entering the inlet opening.

24. A pneumatic dispatch system having an air conduit and means for controlling the flow of air therethrough comprising a valve and a seat therefor, the valve when fully open being disposed out of the path of the air current flowing in the conduit, and air actuated means disposed within such air current for moving the valve toward its seat and into the path of the air current flowing toward and through the valve seat.

Signed by us at Syracuse, N. Y., and Hartford, Conn., this 23rd and 24th day of October, 1924.

JAMES G. MACLAREN.
WILLIAM J. HEPPERLE.